US012572403B2

(12) United States Patent
Zhou et al.

(10) Patent No.: US 12,572,403 B2
(45) Date of Patent: Mar. 10, 2026

(54) AUTOMATICALLY CONVERTING ERROR LOGS HAVING DIFFERENT FORMAT TYPES INTO A STANDARDIZED AND LABELED FORMAT HAVING RELEVANT NATURAL LANGUAGE INFORMATION

(71) Applicant: International Business Machines Corporation, Armonk, NY (US)

(72) Inventors: Xin Zhou, Beijing (CN); Qi Cheng Li, Beijing (CN); Lijun Mei, Beijing (CN); Chuang Gan, Cambridge, MA (US); Hao Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 17/034,284

(22) Filed: Sep. 28, 2020

(65) Prior Publication Data

US 2022/0101115 A1 Mar. 31, 2022

(51) Int. Cl.
*G06F 11/07* (2006.01)
*G06F 40/205* (2020.01)
*G06F 40/295* (2020.01)

(52) U.S. Cl.
CPC ........ *G06F 11/0769* (2013.01); *G06F 40/205* (2020.01); *G06F 40/295* (2020.01)

(58) Field of Classification Search
None
See application file for complete search history.

(56) References Cited

U.S. PATENT DOCUMENTS 5,463,768 A * 10/1995 Cuddihy ............... G06F 11/079
714/37
8,010,528 B2 * 8/2011 Nastacio ............... G06F 16/334
707/728

(Continued)

FOREIGN PATENT DOCUMENTS

CN 105653444 B 7/2018

OTHER PUBLICATIONS

Hartmann, Bjorn et al. "HyperSource: bridging the gap between source and code-related web sites" (pp. 421-422), May 7, 2011, Association for Computing Machinery. <https://doi.org/10.1145/1978942.1979263> (Year: 2011).*

(Continued)

*Primary Examiner* — Tamara T Kyle
*Assistant Examiner* — Tyler Schallhorn
(74) *Attorney, Agent, or Firm* — Cantor Colburn LLP; Andre L. Adkins

(57) ABSTRACT

Embodiments of the invention are directed to computer-implemented methods of labeling unlabeled electronic information. In a non-limiting embodiment of the invention, the computer-implemented method includes receiving, using a processor system, an unlabeled error log (EL) having an EL format. A set of unlabeled EL keywords are extracted from the unlabeled EL. For each unlabeled EL keyword, the processor system uses the unlabeled EL keyword to extract an electronic document (ED) sentence from an ED based on a determination that the ED sentence is relevant to the unlabeled EL keyword. One or more ED keywords are extracted from the ED sentence. A deep neural network of the processor system is used to predict an ED sentence label for the ED sentence, an ED keyword label for the ED keyword, and an EL keyword label for the unlabeled EL keyword.

20 Claims, 10 Drawing Sheets

(56) References Cited

U.S. PATENT DOCUMENTS

| | | | | |
|---|---|---|---|---|
| 8,161,325 | B2* | 4/2012 | Calman | G06F 11/079 |
| | | | | 714/26 |
| 8,527,811 | B2* | 9/2013 | Gilbert | H04L 41/5074 |
| | | | | 714/33 |
| 9,092,314 | B2* | 7/2015 | Roy | G06F 16/284 |
| 9,183,072 | B1* | 11/2015 | Makuch | G06F 11/0709 |
| 10,303,533 | B1 | 5/2019 | Panov et al. | |
| 10,332,012 | B2* | 6/2019 | Reddy | G06F 16/00 |
| 10,452,700 | B1* | 10/2019 | Truong | G06F 16/35 |
| 10,587,555 | B2* | 3/2020 | Machol | H04L 51/18 |
| 10,614,085 | B2* | 4/2020 | Chakra | G06F 11/0766 |
| 10,614,398 | B2* | 4/2020 | Chakra | G06F 16/2465 |
| 10,649,836 | B2* | 5/2020 | Panigrahi | G06F 16/248 |
| 10,678,621 | B2* | 6/2020 | Thompson | G06F 21/6245 |
| 10,684,910 | B2* | 6/2020 | Chau | G06F 18/22 |
| 10,694,056 | B1* | 6/2020 | Thommandru | H04L 63/08 |
| 10,776,577 | B2* | 9/2020 | Sharma | G06N 20/00 |
| 10,949,765 | B2* | 3/2021 | Duraisamy Soundrapandian | |
| | | | | G06F 40/30 |
| 11,113,137 | B2* | 9/2021 | Gaida | G06N 20/00 |
| 11,176,015 | B2* | 11/2021 | Rallapalli | G06F 11/3068 |
| 11,249,833 | B2* | 2/2022 | Singh | G06F 11/302 |
| 11,263,207 | B2* | 3/2022 | Sylos | G06F 40/30 |
| 11,354,221 | B2* | 6/2022 | Rodgers | G06F 16/9566 |
| 11,366,713 | B2* | 6/2022 | Honnappa | G06F 11/3636 |
| 11,379,538 | B1* | 7/2022 | McClusky | G06F 16/93 |
| 11,392,651 | B1* | 7/2022 | McClusky | G06F 40/295 |
| 11,436,531 | B2* | 9/2022 | Li | G06N 20/00 |
| 11,475,882 | B1* | 10/2022 | Lin | G10L 15/18 |
| 11,645,136 | B2* | 5/2023 | Hanzawa | G06F 11/0721 |
| | | | | 714/57 |
| 11,663,176 | B2* | 5/2023 | Sriharsha | G06F 16/258 |
| | | | | 707/804 |
| 11,762,916 | B1* | 9/2023 | McClusky | G06F 16/24578 |
| | | | | 707/728 |
| 11,853,149 | B2* | 12/2023 | Shah | G06F 11/0769 |
| 2007/0005344 | A1* | 1/2007 | Sandor | G06F 16/313 |
| | | | | 707/E17.084 |
| 2007/0192265 | A1* | 8/2007 | Chopin | G06F 40/18 |
| | | | | 706/20 |
| 2007/0283194 | A1 | 12/2007 | Villella et al. | |
| 2009/0222436 | A1* | 9/2009 | Nastacio | G06F 16/334 |
| | | | | 707/999.005 |
| 2011/0296243 | A1* | 12/2011 | Calman | G06F 11/079 |
| | | | | 714/E11.029 |
| 2011/0296244 | A1 | 12/2011 | Fu et al. | |
| 2012/0066547 | A1* | 3/2012 | Gilbert | H04L 41/16 |
| | | | | 714/45 |
| 2014/0173350 | A1* | 6/2014 | Roy | G06F 16/284 |
| | | | | 714/37 |
| 2015/0025875 | A1 | 1/2015 | Perrone | |
| 2016/0117211 | A1* | 4/2016 | Makuch | G06F 11/0748 |
| | | | | 714/37 |
| 2017/0063762 | A1* | 3/2017 | Machol | H04L 51/56 |
| 2017/0103329 | A1* | 4/2017 | Reddy | G06N 5/04 |
| 2017/0344413 | A1* | 11/2017 | Chakra | G06F 17/40 |
| 2017/0344926 | A1* | 11/2017 | Chakra | G06F 16/21 |
| 2018/0075363 | A1* | 3/2018 | Duraisamy Soundrapandian | |
| | | | | G06F 40/30 |
| 2019/0005018 | A1* | 1/2019 | Sharma | G06N 20/00 |
| 2019/0102243 | A1* | 4/2019 | Thompson | G06F 11/0751 |
| 2019/0317850 | A1* | 10/2019 | Chau | G06F 8/61 |
| 2019/0347149 | A1* | 11/2019 | Panigrahi | G06F 16/24578 |
| 2020/0073738 | A1* | 3/2020 | Gaida | G06F 11/079 |
| 2020/0117734 | A1* | 4/2020 | Sylos | G06F 40/30 |
| 2020/0327008 | A1* | 10/2020 | Singh | G06F 9/451 |
| 2020/0349529 | A1* | 11/2020 | Wang | G06F 40/284 |
| 2021/0142212 | A1* | 5/2021 | Li | G06N 20/00 |
| 2021/0157665 | A1* | 5/2021 | Rallapalli | G06F 11/3068 |
| 2021/0174253 | A1* | 6/2021 | Moore | G06N 7/01 |
| 2021/0303440 | A1* | 9/2021 | Rodgers | G06F 11/3065 |
| 2021/0311918 | A1* | 10/2021 | Cheng | G06F 11/3636 |
| 2021/0326197 | A1* | 10/2021 | Honnappa | G06N 5/022 |
| 2021/0342209 | A1* | 11/2021 | Kishore | G06F 11/0769 |
| 2022/0035775 | A1* | 2/2022 | Sriharsha | G06F 18/2115 |
| 2022/0083320 | A1* | 3/2022 | Balinsky | G06F 11/3628 |
| 2022/0358162 | A1* | 11/2022 | Venugopala Reddy | |
| | | | | G06F 16/164 |
| 2023/0064638 | A1* | 3/2023 | Hanzawa | G06F 11/079 |
| 2023/0084422 | A1* | 3/2023 | Shah | G06F 11/366 |
| | | | | 714/26 |

OTHER PUBLICATIONS

Cordeiro, Joel et al. "Context-based recommendation to support problem solving in software development" (pp. 85-89), Jul. 9, 2012, IEEE. <https://doi.org/10.1109/RSSE.2012.6233418> (Year: 2012).* de Souza, Lucas B. L. et al. "Ranking crowd knowledge to assist software development" (pp. 72-82), Jun. 2, 2014, Association for Computing Machinery. <https://doi.org/10.1145/2597008.2597146> (Year: 2014).*

Rahman, Mohammed et al. "Towards a context-aware IDE-based meta search engine for recommendation about programming errors and exceptions" (pp. 194-203), Feb. 27, 2014, IEEE. <https://doi.org/10.1109/CSMR-WCRE.2014.6747170> (Year: 2014).*

Gao, Qing et al. "Fixing Recurring Crash Bugs via Analyzing Q&A Sites" (pp. 307-318), Jan. 7, 2016, IEEE. <https://doi.org/10.1109/ASE.2015.81> (Year: 2016).*

Treude, Christoph et al. "Augmenting API documentation with insights from stack overflow" (pp. 392-403), May 14, 2016, Association for Computing Machinery. <https://doi.org/10.1145/2884781.2884800> (Year: 2016).*

Ponzanelli, Luca et al. "Supporting Software Developers with a Holistic Recommender System" (pp. 94-105), Jul. 20, 2017, IEEE. <https://doi.org/10.1109/ICSE.2017.17> (Year: 2017).*

Du et al., "DeepLog: Anomaly Detection and Diagnosis from System Logs through Deep Learning." Proceedings of the 2017 Acm Sigsac Conference on Computer and Communications Security. ACM, 2017 (14 pages).

Siddiqi et al., "Keyword and Keyphrase Extraction Techniques: A Literature Review," International Journal of Computer Applications 109.2 (2015), pp. 18-23.

* cited by examiner

Labeled Training Data Example

302

Error Log (Labeled)

Message: *DB2 Connection failed.*
Reported Exception: *java*.lang.*ClassNotFoundException:*
com.db2.jdbc.Driver in Eclipse
java.lang.ClassNotFoundException: com.db2.jdbc.Driver
at
org.apache.catalina.loader.WebappClassLoader.loadClass(We
bappClassLoader.java:1714)
at
org.apache.catalina.loader.WebappClassLoader.loadClass(We
bappClassLoader.java:1559)
.......

306

Forum Article/Issue

I use *DB2* 11 database in my *Java* project. When
connecting to DB2, there is an exception
*"ClassNotFoundException"*, and the *connection failed.*
Can you help me please? Thanks!

Error logs:
Message: Connection failed.
Reported Exception: java.lang.ClassNotFoundException:
com.mysql.jdbc.Driver in Eclipse
.......

304

Labeled Structured Data

| Software | DB2 |
| Component | Jdbc driver |
| Version | DB2 11 |
| Environment | Java |
| Issue | Database Connection Failed. |

308

Keywords in error log:
Connection failed, exception, ClassNotFoundException

Context-relevant description sentences:
- I use *DB2* 11 database in my *Java* project.
- When connecting to DB2, there is an exception
*"ClassNotFoundException"*, and the *connection failed.*

Keywords in context-relevant description sentences : :
DB2, database, Java, Connection failed, exception,
ClassNotFoundException

FIG. 3

AUTOMATICALLY CONVERTING ERROR LOGS HAVING DIFFERENT FORMAT TYPES INTO A STANDARDIZED AND LABELED FORMAT HAVING RELEVANT NATURAL LANGUAGE INFORMATION

BACKGROUND

The present invention relates generally to programmable computer systems, and more specifically to computer-implemented methods, computer systems and computer program products configured and arranged to automatically convert error logs having different error log format types into a standardized and labeled error log format having posted and/or network-derived information that is relevant to the error log.

In computer science, an error log is a record of critical errors that are encountered by a software application, operating system or server while in operation. Each entry of an error log is known as an error message. Error logs are useful tools for troubleshooting and managing systems, servers and even networks. Error logs and their error messages are set up in different ways for different applications, operating systems, networks or servers. Some error logs are configured to capture every single error that occurs in a computer system, and some error logs are designed to selectively store error information pertaining to specific error codes. Some error logs only capture certain information about the error, while other error logs are programmed to capture all available information such as timestamp, system information, user location, and user entry. In many cases, access to error logs and individual error messages needs special administrative rights.

In general, the terms "natural language" refer to language that has been developed by humans over time as a method of communicating between people, rather than language that has been created for communication between non-human entities such as computers (i.e., machine-generated codes). Known error logs include machine-generated codes with occasional natural language components that are not sentences.

SUMMARY

Embodiments of the invention are directed to computer-implemented methods of labeling unlabeled electronic information. In a non-limiting embodiment of the invention, the computer-implemented method includes receiving, using a processor system, an unlabeled error log (EL) having an EL format. An unlabeled EL keyword is extracted from the unlabeled EL. The processor system uses the unlabeled EL keyword to extract an electronic document (ED) sentence from an ED based on a determination that the ED sentence is relevant to the unlabeled EL keyword. An ED keyword is extracted from the ED sentence. A deep neural network of the processor system is used to predict an ED sentence label for the ED sentence, an ED keyword label for the ED keyword, and an EL keyword label for the unlabeled EL keyword.

Embodiments of the invention are further directed to a computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 3 depicts is an example of the training data that can be utilized in the training methodology shown in FIG. 2;

Figure 1:
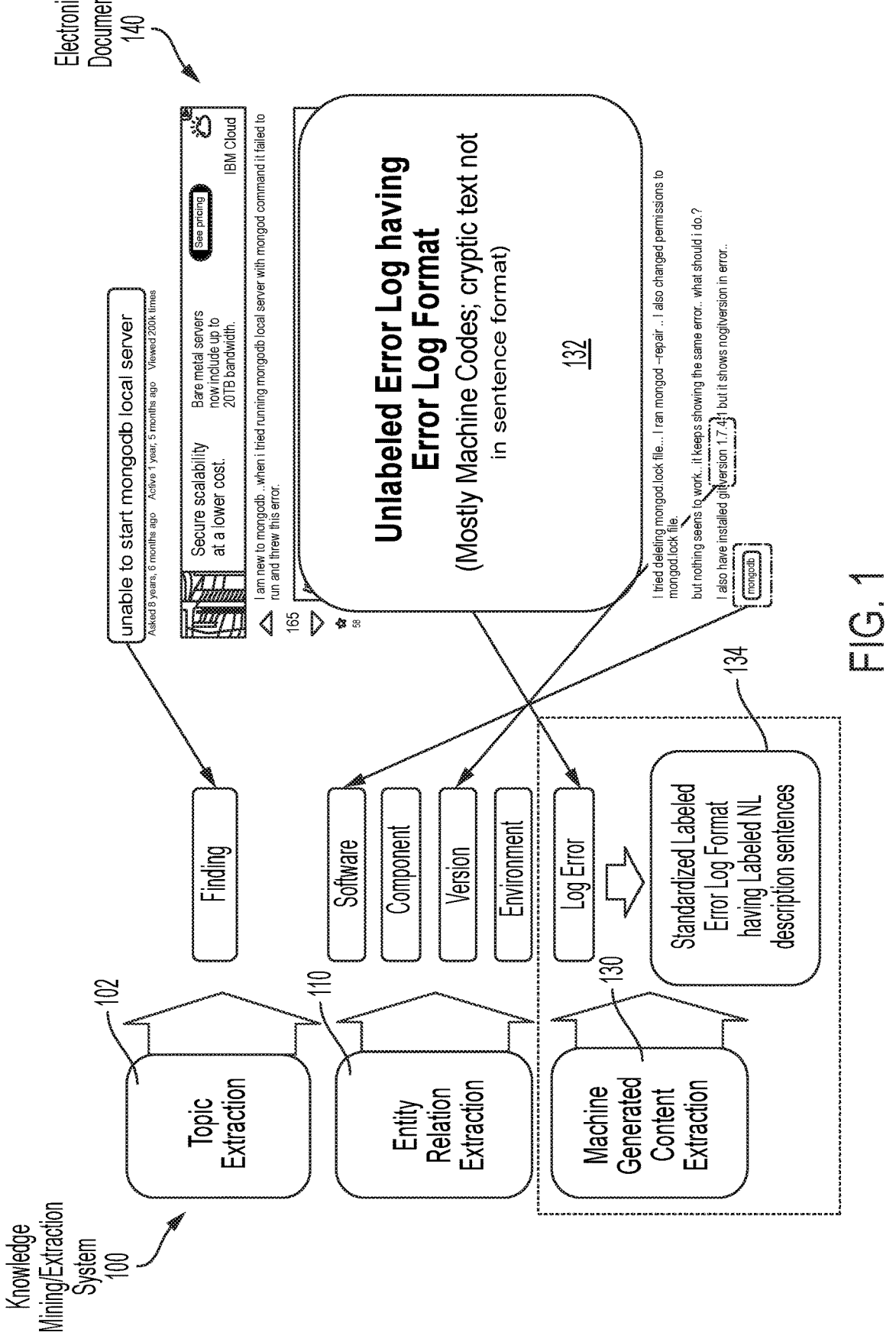
FIG. 1 depicts a high-level block diagram of a system embodying aspects of the invention.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

Turning now to a more detailed description of technologies that are more specifically related to aspects of the invention, the term "software" refers to the set of electronic program instructions or data a computer processor reads in order to perform a task or operation. There are two main categories of software, namely systems software and application software. Systems software includes the programs that are dedicated to managing the computer itself, such as the operating system, file management utilities, and disk operating system (or DOS). Application software enables the end-user to complete tasks such as creating documents, spreadsheets, databases, and publications; doing online research; sending email; designing graphics; running businesses; and even playing games. Application software can be installed locally on the end-user's computer or mobile device, or it can be stored on the cloud and accessed by any Internet-connected device. Application software is specific to the task for which it was designed and can be as simple as a calculator application or as complex as a word processing application.

As previously noted herein, computer systems generate error logs that are a record of critical errors that are encountered by a software application, operating system or server while in operation. In order to ensure the performance of software systems, it would be helpful to evaluate the software system's error logs as part of a troubleshooting process to uncover and address the root cause of performance issues that result in the generation of error logs. However, for a variety of reasons, error logs are not easy to interpret by humans or machines. Error logs and their error messages are set up in different ways for different applications, operating systems, networks or servers. The contents of known error logs are primarily machine-generated codes with occasional natural language components that are not sentences. Additionally, there are many different error log types and error log formats that are generated by different programming languages. Even within the same programming language, many different error log types and error log formats are generated.

Turning now to an overview of aspects of the present invention, embodiments of the invention are directed to computer-implemented methods, computer systems and computer program products configured and arranged to automatically convert unlabeled error logs having different format types into a standardized and labeled error log format having posted and/or network-derived information that is relevant to the error log. In accordance with aspects of the invention, a predictive neural network is trained to perform the task(s) of predicting the appropriate labels for keywords in unlabeled error logs; the appropriate labels for descriptive natural language (NL) text that provides additional information about the keywords in the unlabeled error log; and appropriate labels for keywords in descriptive NL text. In general, each predicted label is metadata attached to the relevant keyword or sentence that provides additional details about the underlying performance issue that caused the error log to be generated. For example, in some embodiments of the invention, each predicted label can identify a category or other description (e.g., disk issue, memory issue, memory allocation issue, and the like) of the performance issue that caused the error log to be generated.

In embodiments of the invention, when the predicted labels are attached to the keywords and descriptive NL sentences, the labeled keywords and labeled NL sentences can be automatically searched or otherwise manipulated by a programmable computer to populate a standardized error log format that is more easily read and understood by humans (e.g., a subject matter expert), and that is more easily processed and analyzed by downstream software trouble shooting systems (e.g., knowledge mining systems, software program monitoring systems, and the like). In an example embodiment of the invention, the standardized and labeled error log format can be customized to include user-selected fields and user-selected formatting that is preferred by a user. In an example embodiment of the invention, the user-selected fields of the standardized and labeled error log format can include, but are not limited to, an "issue" field that summarizes the underlying issue that generated the error log (e.g., "database connection failed"); a "NL description sentences" field that contains the NL description sentences that contain labeled NL sentence keywords (which can be highlighted or otherwise emphasizes) that are relevant to the issue; a "keywords in the NL description sentences" field that lists the keywords (which can be highlighted or otherwise emphasizes) in the NL description sentence that are relevant to the issue; a "keywords in error log" field that lists the keywords (which can be highlighted or otherwise emphasizes) in the error log that are relevant to the issue; and an "error log" field that contains the machine codes and NL text of the error code with the error log keywords that are relevant to the issue being highlighted or otherwise emphasizes.

In embodiments of the invention, the inputs to the predictive neural network are generated and input to the predictive neural network during a runtime of the software program that generated the error log. In embodiments of the invention, the predictive neural network inputs are generating by accessing an unlabeled error log and using keyword and/or keyphrase extraction algorithms to extract keywords from the unlabeled error log. The error log keywords are input to a search tool (e.g., a cognitive or expression-based social media monitoring (SMM) tool) configured to search electronic documents to identify the NL descriptive sentences in the electronic documents that are relevant to the extracted error log keywords. In some embodiments of the invention, the electronic document can include but is not limited to a user manual, a technical manual, a technical article, a post on a website, or any other document that is in an electronic format that can be electronically searched and/or analyzed. When the relevant NL description sentences are identified, the error log keywords and keyword/keyphrase extraction algorithms are used to extract NL description sentence keywords from the relevant NL description sentences.

In embodiments of the invention, the predictive neural network is trained using a training data set that includes a variety of types of error logs that have been labeled in a manner that matches the predictive task that will be performed by the predictive neural network. Although the label for the training data should generally match the predictive tasks that will be performed by the predictive neural network, the error log labels generated at the training stage can be at a sufficiently high level to apply to a wide variety of software application types. For example, error log labels generated at the training stage can be for error logs that come from one type of database (e.g., DB2), but the training error labels can be kept at a sufficiently high level of detail (e.g., database connection failed) that the predictive methodology learned by the predictive neural network can be used to accurately predict labels for a wide variety of data base types (e.g., MySql). In embodiments of the invention, the labeled training error logs can be generated in any suitable fashion, including manually or through any suitable machine-based method. In embodiments of the invention, to improve accuracy of the training data, subject matter experts (SMEs) can be used to evaluate training error logs and generate labels that will be attached to the training error log to form a labeled training error log.

In embodiments of the invention, the predictive neural network training data includes training error label keywords derived from labeled training error logs; NL description sentences generated based on the training error label keywords; NL description sentence keywords generated based on the training error label keywords; and the training labels attached to the training error logs. In embodiments of the invention, other than generating the training error log label and attaching the training error log label to the training error log, the predictive neural network training data is generated in substantially same way that the predictive neural network inputs are generating.

Turning now to a more detailed description of aspects of the invention, FIG. 1 depicts an example of a knowledge mining/extraction system 100 capable of implementing embodiments of the present invention. The system 100 includes modules 102, 110, 130 configured and arranged to perform a variety of keyword searching, keyphrase searching, information extraction, and machine learning operations on electronic documents 140. In the embodiment of the invention shown in FIG. 1, the electronic document 140 is a posting at a website. In aspects of the invention, the electronic document can take a variety of forms, including but not limited to articles, software operation manuals, articles, and any other electronic document that contains information that might be relevant to an issue-of-interest. Examples of systems that can be included in the modules 102, 110, 130 to perform keyword searching, keyphrase searching, information extraction, and machine learning operations on electronic documents 140 are depicted as an expression-based cognitive SMM tool 608 shown in FIG. 6; a deep neural network 250A shown in FIG. 7; a machine learning system 800 shown in FIG. 8; a training algorithm 900 shown in FIG. 9; and computer system 1000 shown in FIG. 10.

As show in FIG. 1, the module 102 is configured to extract topic information from the electronic document 140; the module 110 is configured to extract entity relation information (e.g., software, component, version, environment) from the electronic document 140; and the module 130 is configured to extract information from the unlabeled error log 132 of the electronic document 140 in accordance with embodiments of the invention. More specifically, module 130 is configured to convert the unlabeled error log 132 from its current error log format to a standardized labeled error log format 134 having labeled NL description sentences. The module 130 can execute the predictive training methodology 200 (shown in FIG. 2) and the predictive labeling methodology 220 (shown in FIG. 2).

In some embodiments of the invention, the information the system 100 needs to extract from the electronic document 140 is not in a single location, and the system 100 must access multiple locations to extract and assemble the same information. For example, the system 100 can access the unlabeled error log 132 from a computer system that is running a software program that generated the unlabeled error log 132 then execute the predictive training methodology 220 to generate the standardized labeled error log format 134 having labeled NL description sentences. The modules 102, 110 can then either extract topic and entity relation information from the standardized labeled error log format 134 having labeled NL description sentences, or the modules 102, 110 can use the standardized labeled error log format 134 as a guide to search for and locate the relevant electronic documents from which the topic and entity relation information can be extracted.

Figure 2:
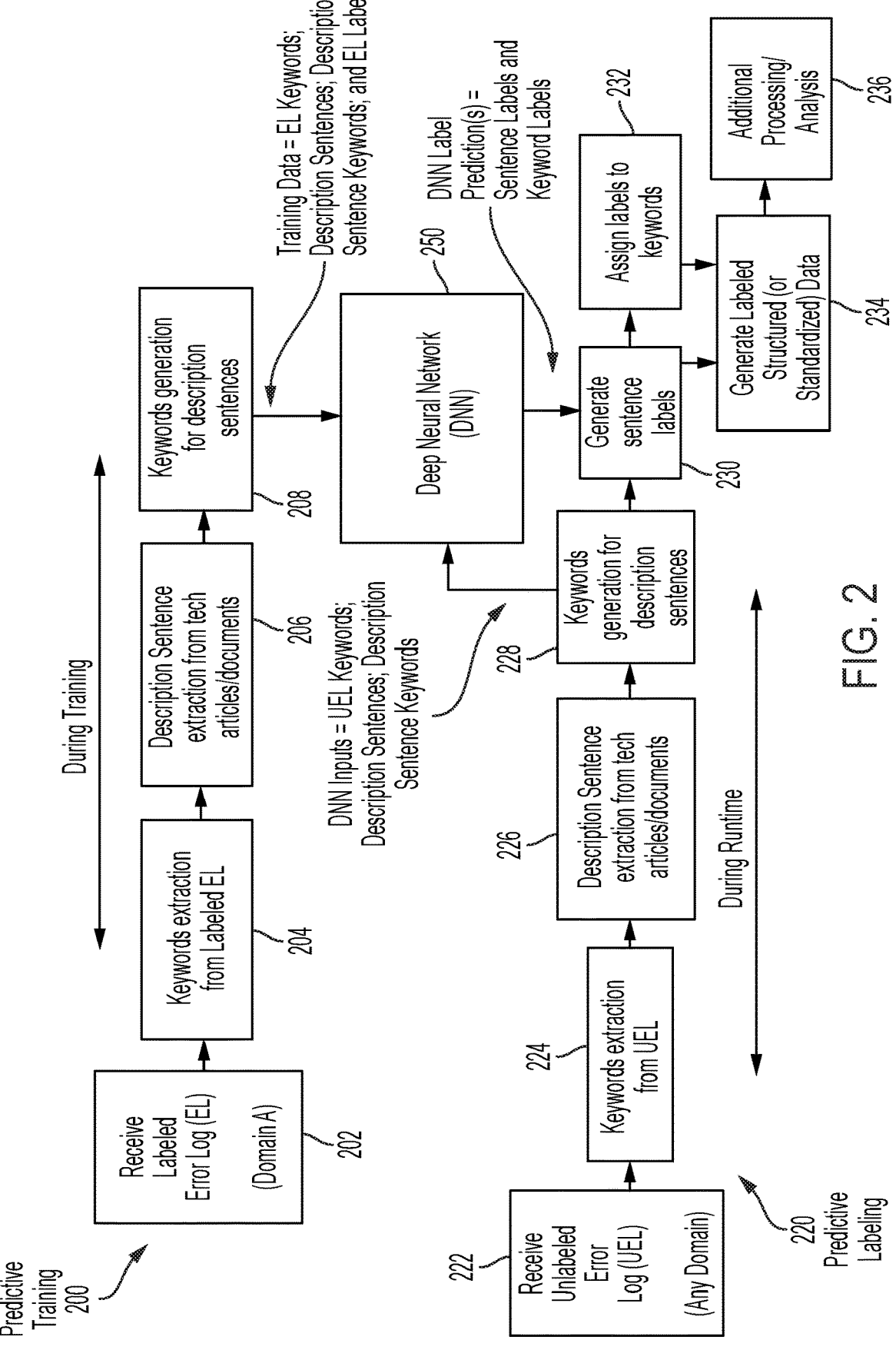
FIG. 2 depicts a flow diagram illustrating a computer-implemented neural network training methodology and a computer-implemented neural network prediction methodology, both of which are applied to a neural network in accordance with aspects of the invention.

FIG. 2 depicts a flow diagram illustrating a computer-implemented neural network predictive training methodology 200 and a computer-implemented neural network predictive labeling methodology 220, both of which are applied to a neural network 250 in accordance with aspects of the invention. The following descriptions of the methodologies 200, 220 will also make reference to examples implementations of the methodologies 200, 220 shown in FIGS. 3, 4, and 5. In the examples shown in FIGS. 3 and 4, selected instances of keywords and/or description sentences are shown in highlighted text. The methodologies 200, 220 utilize keyword searching, keyphrase searching, information extraction, and machine learning operations on electronic documents 140 that can be executed using the expression-based cognitive SMM tool 608 shown in FIG. 6; the deep neural network 250A shown in FIG. 7; the machine learning system 800 shown in FIG. 8; and the computer system 1000 shown in FIG. 10. Although the predictive training methodology 200 and the predictive labeling methodology 220 illustrated in FIG. 2 include the analysis of "keywords," in embodiments of the invention, the methodologies 200, 220 can analyze keyphrases instead of keywords, or can analyze any combination of keywords in combination with keyphrases.

As shown in FIG. 2, the predictive training method 200 begins at block 202 by receiving (or accessing) labeled training error logs, an example of which is shown at 302, 304 in FIG. 3. In embodiments of the invention, the labeled training error logs received at block 202 includes a variety of types of error logs that have been labeled in a manner that matches the predictive task that will be performed by the predictive neural network 250. Although the label for the training data should generally match the predictive tasks that will be performed by the predictive neural network 250, the error log labels received block 202 can be at a sufficiently high level to apply to a wide variety of software application types. For example, training error log labels received at the block 202 can be for error logs that come from one type of database (e.g., DB2), but the training error labels can be kept at a sufficiently high level of detail (e.g., database connection failed) that the predictive methodology 200 learned by the predictive neural network 250 can result in a predictive labeling methodology 220 that is sufficiently broad that it can be used to accurately predict labels for a wide variety of data base types (e.g., MySql).

Figure 9:
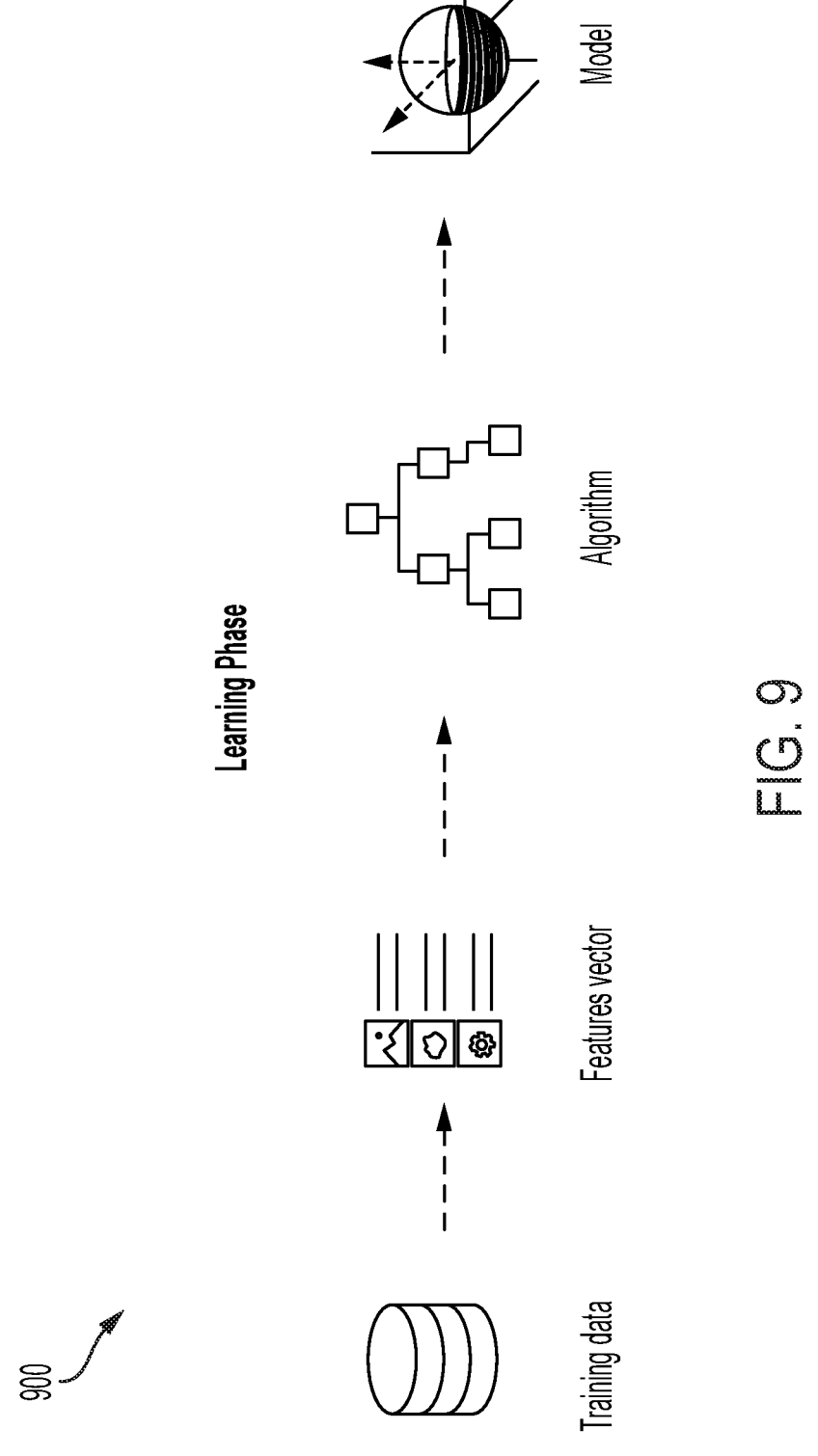
FIG. 9 depicts a learning phase that can be implemented by the neural network shown in FIG. 8.

At block 204, the methodology 200 uses keyword and/or keyphrase extraction algorithms to extract keywords from the labeled training error log, and an example of the extracted training error log keywords is depicted at 308 in FIG. 3. At block 206, the training error log keywords are used by a search tool (e.g., the SMM tool 608 shown in FIG. 6) configured to search electronic documents (e.g., 306 shown in FIG. 3; and/or 140 shown in FIG. 1)) to identify the NL descriptive sentences in the electronic documents 306, 140 that are relevant to the training error log keywords (e.g., 308 shown in FIG. 3). At block 208, the error log keywords and keyword/keyphrase extraction algorithms are used to extract NL description sentence keywords from the relevant NL description sentences, an example of which is shown at 308 in FIG. 3. At 308 in FIG. 3, the NL description sentences are described as "context-relevant description sentences" because the NL description sentences provide context and a fuller description of the issue(s) associated with the labeled training error log received at block 202. The methodology 200 provides the training error log keywords, the extracted NL description sentences; the extracted NL description sentence keywords; and the error labels as training data to the neural network 250. The neural network 250 uses the training data to learn its assigned task(s) of predicting the appropriate labels for keywords in the unla- beled error logs; predicting the appropriate labels the for descriptive NL sentences that provide additional information about the keywords in the unlabeled error log; and appro- priate labels for keywords in the descriptive NL sentences. In general, each of the above-described predicted labels is metadata attached to the relevant keyword or sentence that provides additional details about the underlying perfor- mance issue that caused the error log to be generated. For example, in some embodiments of the invention, each predicted label can identify a category or other description (e.g., disk issue, memory issue, memory allocation issue, and the like) of the performance issue that caused the training error log to be generated. Details of example training operations that can be performed by the neural network 250 on the training data are shown in FIG. 9 and described subsequently herein.

Figure 4:
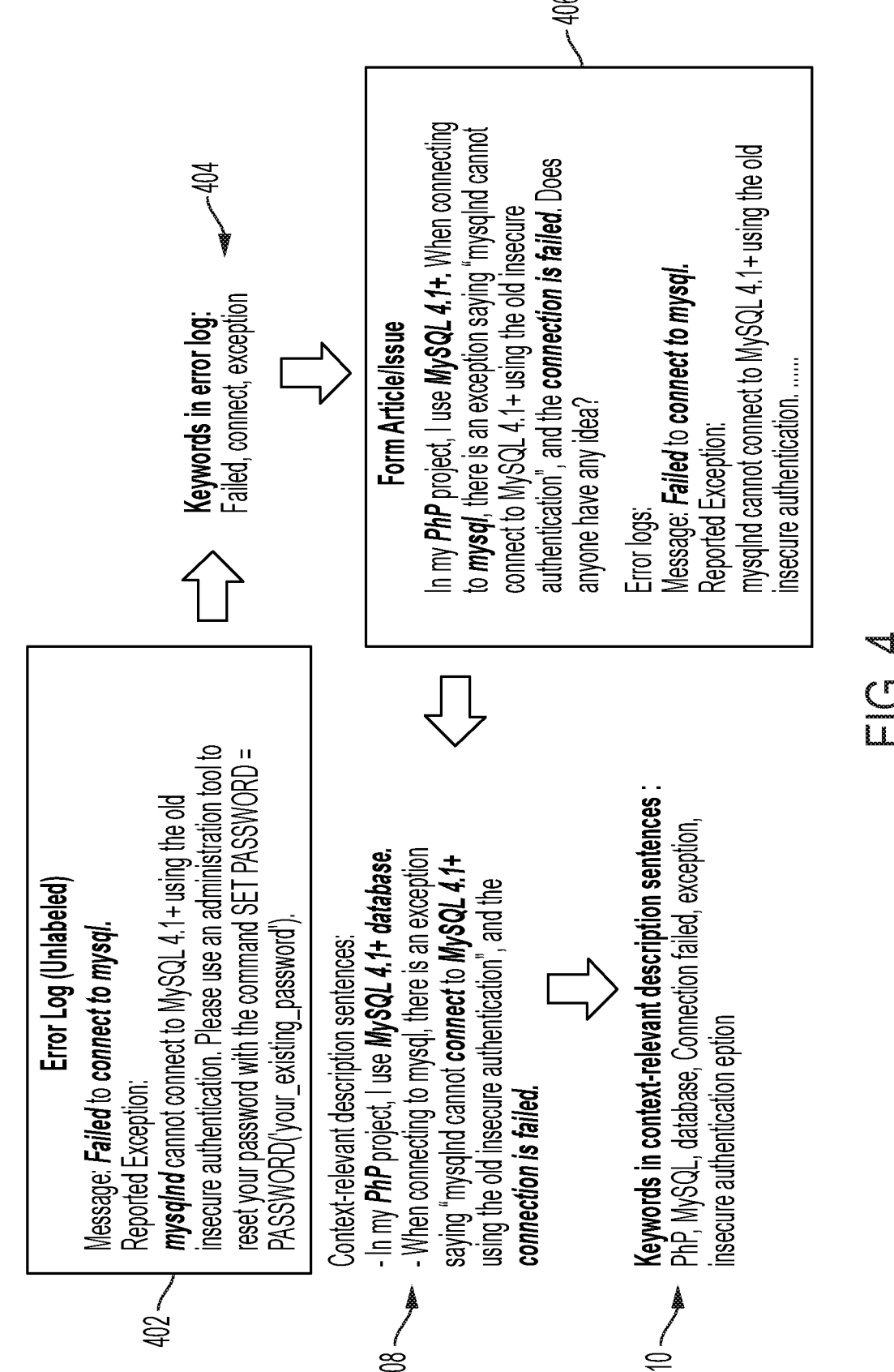
FIG. 4 depicts a portion of an example of how unlabeled error logs are utilized in the prediction methodology shown in FIG. 2.
Figure 5:
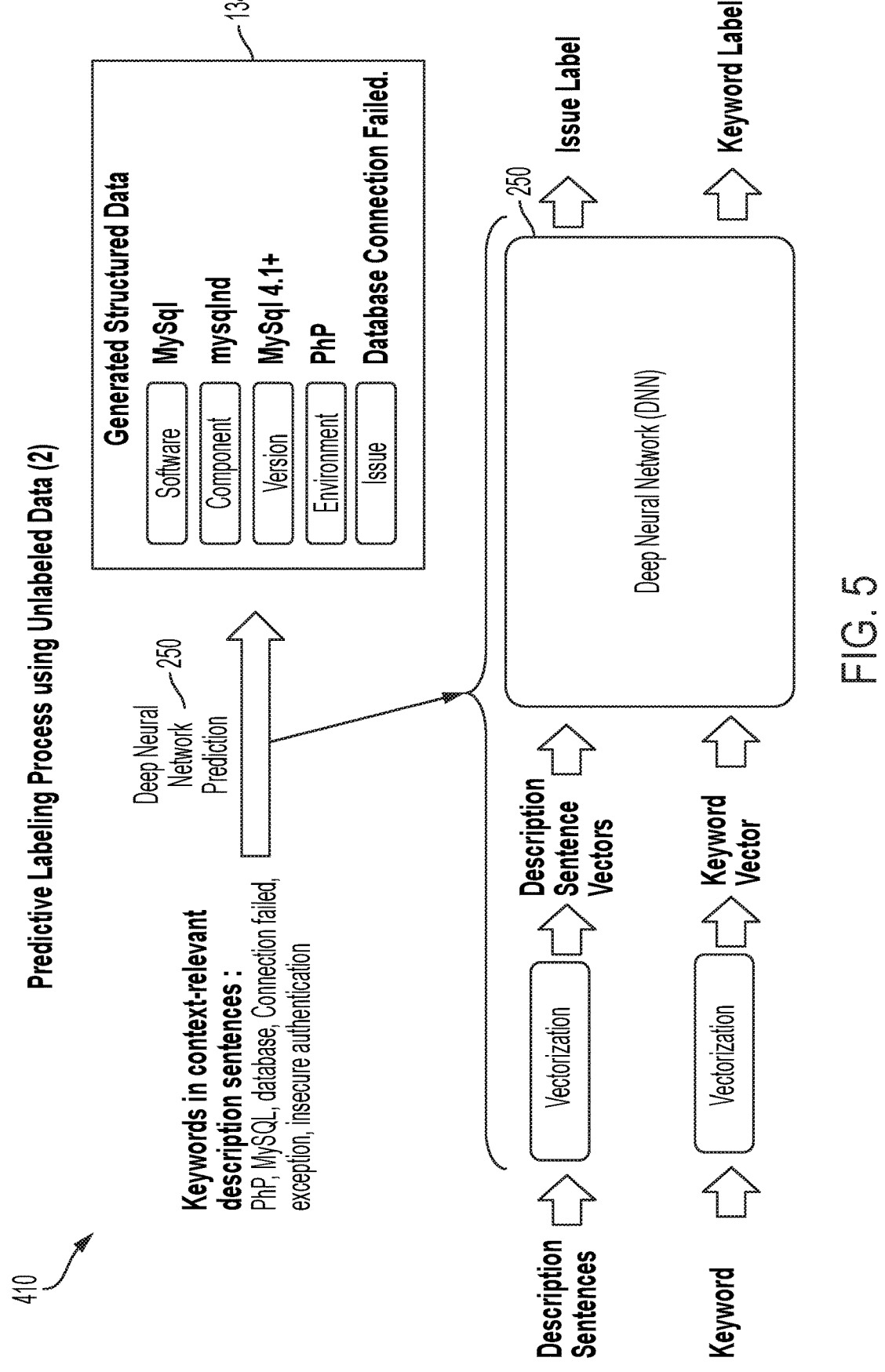
FIG. 5 depicts another portion of the example depicted in FIG. 4.

The predictive labeling methodology 220 begins at block 222 by receiving unlabeled error logs, an example of which is shown at 402 in FIG. 4. At block 224, the methodology 220 uses keyword and/or keyphrase extraction algorithms to extract keywords (e.g., 404 shown in FIG. 4) from the unlabeled error log (e.g., 402 in FIG. 4). At block 226, the extracted error log keywords are used by a search tool (e.g., the SMM tool 608 shown in FIG. 6) configured to search electronic documents (e.g., 406 shown in FIG. 4; and/or 140 shown in FIG. 1)) to identify the NL descriptive sentences (e.g., 408 shown in FIG. 4) in the electronic documents 406, 140 that are relevant to the error log keywords (e.g., 404 shown in FIG. 4). At block 228, the error log keywords and keyword/keyphrase extraction algorithms are used to extract NL description sentence keywords (e.g., 410 shown in FIG. 4) from the relevant NL description sentences (e.g., 408 shown in FIG. 4). At 408 in FIG. 4, the NL description sentences are described as context-relevant description sen- tences because the NL description sentences provide context and a fuller description of the issue(s) associated with the unlabeled error log received at block 222. The methodology 220 at block 228 provides the error log keywords, the extracted NL description sentences, and the extracted NL description sentence keywords to the neural network 250. The neural network 250 uses the inputs provided by block 228 to perform its trained task of predicting the appropriate labels for keywords in the unlabeled error logs; predicting the appropriate labels the for descriptive NL sentences that provide additional information about the keywords in the unlabeled error log; and appropriate labels for keywords in the descriptive NL sentences. In general, each of the above-described predicted labels is metadata attached to the rel- evant keyword or sentence that provides additional details about the underlying performance issue that caused the error log to be generated. For example, in some embodiments of the invention, each predicted label can identify a category or other description (e.g., disk issue, memory issue, memory allocation issue, and the like) of the performance issue that caused the training error log to be generated. The output of block 228 and the prediction(s) generated by the neural network 250 are provided to block 230, which generates (or assigns) the predicted sentence labels to the NL description sentences. Block 232 uses the output from block 230 (which can include the output from the neural network 250) to assign predicted labels to the various keywords that were used by the neural network 250. Example of how the prediction operations performed by the neural network 250 can be implemented are described in greater details subse- quently herein and shown by the systems 250A, 800 in FIGS. 7 and 8, respectively.

At block 234, the predictive labeling methodology 220 uses known computer analysis processes to leverage the labeled keywords and labeled NL sentences (as well as, optionally, leverage other information generated during the methodology 220) to automatically search and/or otherwise manipulate the labeled keywords and labeled NL sentences (as well as, optionally, leverage other information generated during the methodology 220) to populate a standardized error log format that is more easily read and understood by humans (e.g., a subject matter expert), and that is more easily processed and analyzed by downstream software trouble shooting systems (e.g., additional processing/analy- sis block 236, which can be knowledge mining systems, software program monitoring systems, and the like). In an example embodiment of the invention, the standardized and labeled error log format generated at block 234 can be customized to include user-selected fields and user-selected formatting that is preferred by a user. In an example embodi- ment of the invention, the user-selected fields of the stan- dardized and labeled error log format can include, but are not limited to, an "issue" field that summarizes the under- lying issue that generated the error log (e.g., "database connection failed"); a "NL description sentences" field that contains the NL description sentences that contain labeled NL sentence keywords (which can be highlighted or other- wise emphasizes) that are relevant to the issue; a "keywords in the NL description sentences" field that lists the keywords (which can be highlighted or otherwise emphasizes) in the NL description sentence that are relevant to the issue; a "keywords in error log" field that lists the keywords (which can be highlighted or otherwise emphasizes) in the error log that are relevant to the issue; and an "error log" field that contains the machine codes and NL text of the error code with the error log keywords that are relevant to the issue being highlighted or otherwise emphasizes. An example standardized and labeled error log format is depicted at 134A in FIG. 5.

Accordingly, embodiments of the invention are directed to computer-implemented methods, computer systems, and computer program products configured and arranged to predict labels for unlabeled electronic information. In a non-limiting embodiment of the invention, the computer- implemented method includes receiving, using a processor system, an unlabeled error log (EL) having an EL format. A set of unlabeled EL keywords are extracted from the unla- beled EL. For each unlabeled EL keyword, the processor system uses the unlabeled EL keyword to extract an elec- tronic document (ED) sentence from an ED based on a determination that the ED sentence is relevant to the unlabeled EL keyword. One or more ED keywords are extracted from the ED sentence. A deep neural network of the processor system is used to predict an ED sentence label for the ED sentence, an ED keyword label for the ED keyword, and an EL keyword label for the unlabeled EL keyword. As used herein, and particularly as used in the claims, the singular forms "a", "an" and "the" are intended to include the plural forms as well, unless the context clearly indicates otherwise.

Figure 6:
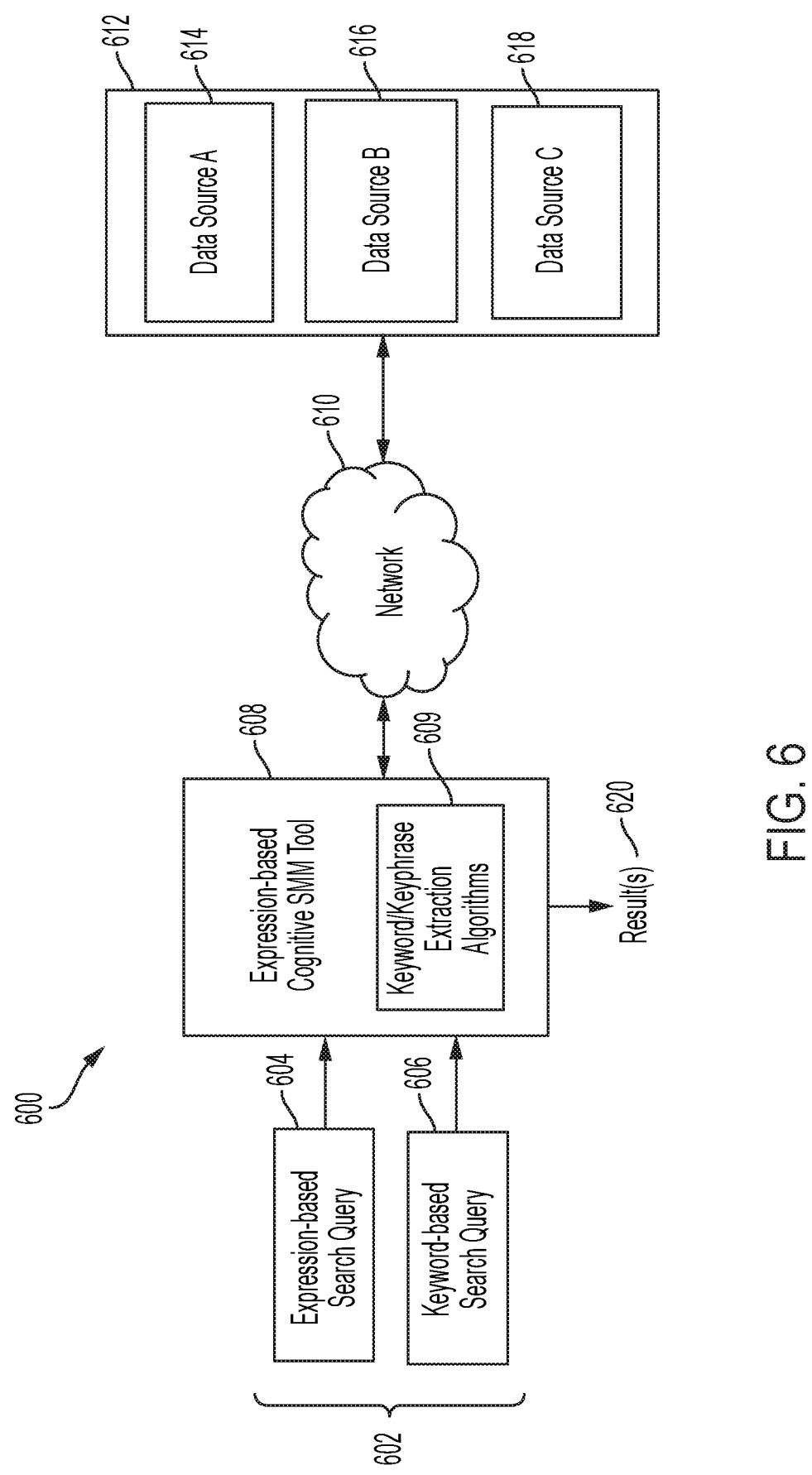
FIG. 6 depicts a block diagram illustrating an example implementation of a social media monitor (SMM) tool that can be used to execute portions of the training methodology and/or the prediction methodology shown in FIG. 2.

FIG. 6 depicts a document content analysis (DCA) system 600 configured to conduct search queries on electronic documents (e.g., electronic document 140 in FIG. 1) located at a variety of data sources 614, 616, 618 at a variety of local and/or remote locations. The system 600 includes an expression-based (or word-pattern-based) SMM tool 608 having keyword/keyphrase extraction algorithms 609. Although the term "social media" implies a focus on "social" sites such as Facebook® or channels such as Twitter®, SMM search tools access a network 610 (e.g., a local network, a wide area network, the Internet, etc.) to pull data from a variety of location types such as blogs, forums, news sites, review sites, data repositories, and others. A typical SMM search tool works by crawling web locations continuously and tagging them. Once tagged, the web locations are searched using some form of keyword-based query 606, expression-based search query 604, or search string that a user develops to find so-called "mentions" of specific words and phrases on the tagged pages. The SMM search tool 608 then brings these "mentions" back into the tool's interface, which can then be read and organized in different ways. The SMM search tool 608 can be configured and arrange to include keyword-based web searching capability, as well as expression-based (or word pattern based) search capability. The SMM search tool 608 can incorporate a robust expression-based cognitive data analysis technology such as IBM Watson®. IBM Watson® is an expression-based, cognitive data analysis technology that processes information more like a human than a computer, through understanding natural language, generating hypotheses based on evidence and learning as it goes. Additionally, expression-based, cognitive computer analysis provides superior computing power to keyword-based computer analysis for a number of reasons, including the more flexible searching capabilities of "word patterns" over "keywords" and the very large amount of data that may be processed by expression-based cognitive data analysis. The SMM search tool 608 can be configured to conduct the keyword-based search query 606 using known non-cognitive keyword search techniques and/or expression-based (or word pattern based) cognitive data analysis technology.

The keyword/keyphrase extraction algorithms 609 perform keyword/keyphrase extraction operations configured and arranged to analyze natural language to select the most significant words and/or phrases present in a target search document. In general, the term keyword denotes a single word, and the term keyphrase denotes a sequence of multiple words that fall short of forming a sentence. Broadly speaking there are major categories of suitable approaches for automatic keyword/keyphrase extraction, including but not limited to rule-based linguistic approaches, statistical approaches, machine learning approaches, and domain specific approaches.

Figure 7:
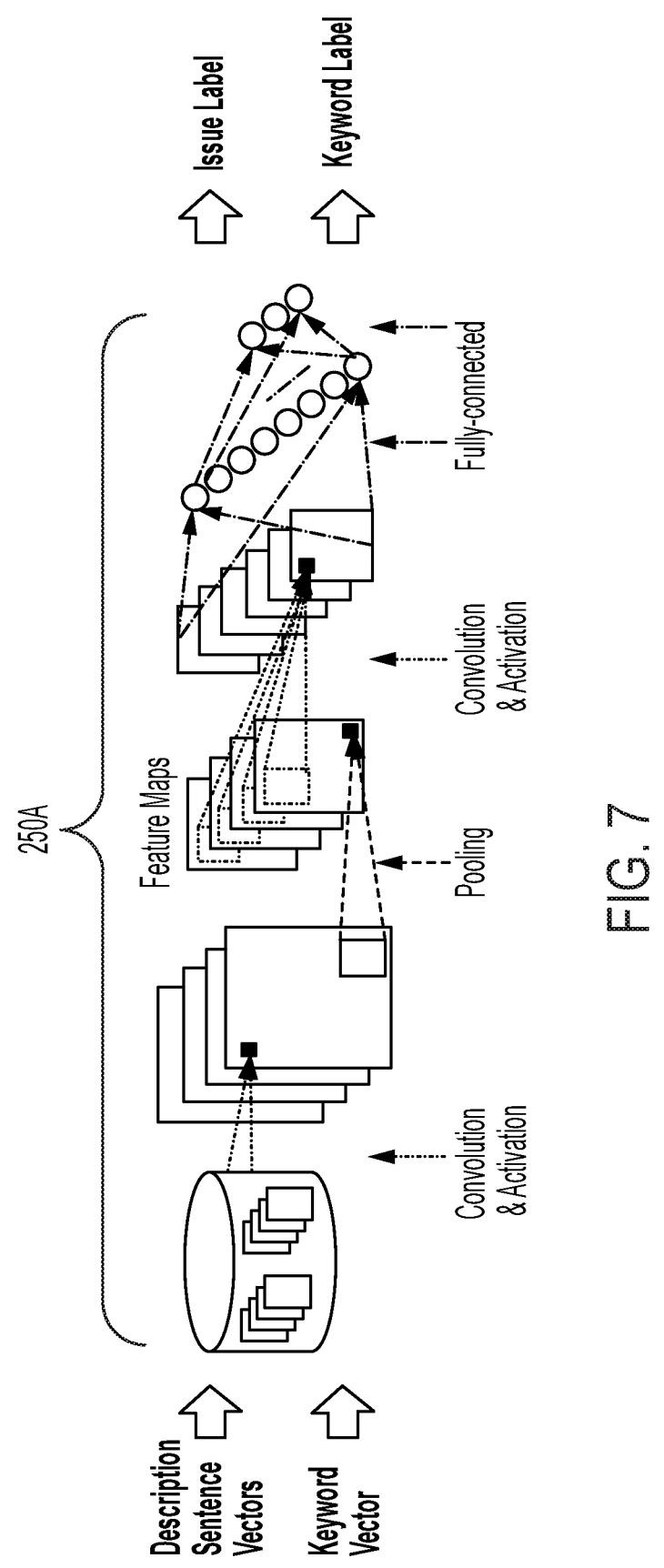
FIG. 7 depicts a block diagram illustrating an example implementation of a neural network that can be used to implement the neural network shown in FIG. 2, and that can be used to implement portions of the training methodology and the prediction methodology shown in FIG. 2.

FIG. 7 depicts an example of how the neural network 250 can be implemented using a neural network that is structured as a NL-based Question and Answer (Q&A) system 250A. The NL Processing (NLP) Q&A system 250A receives vectorized inputs (often identified a questions) and generates responsive outputs (or answers) by querying data repositories and applying elements of language processing, information retrieval and machine learning to arrive at a conclusion. Such systems are able to assist humans with certain types of semantic query and search operations, such as the type of natural question-and-answer paradigm of a medical environment. An example NLP Q&A system is IBM's DeepQA technology. DeepQA systems and methodologies have been developed that are able to understand complex questions input to the system in natural language, and are able to answer the questions with enough precision, confidence, and speed to augment human handling of the same questions within a given environment.

Figure 8:
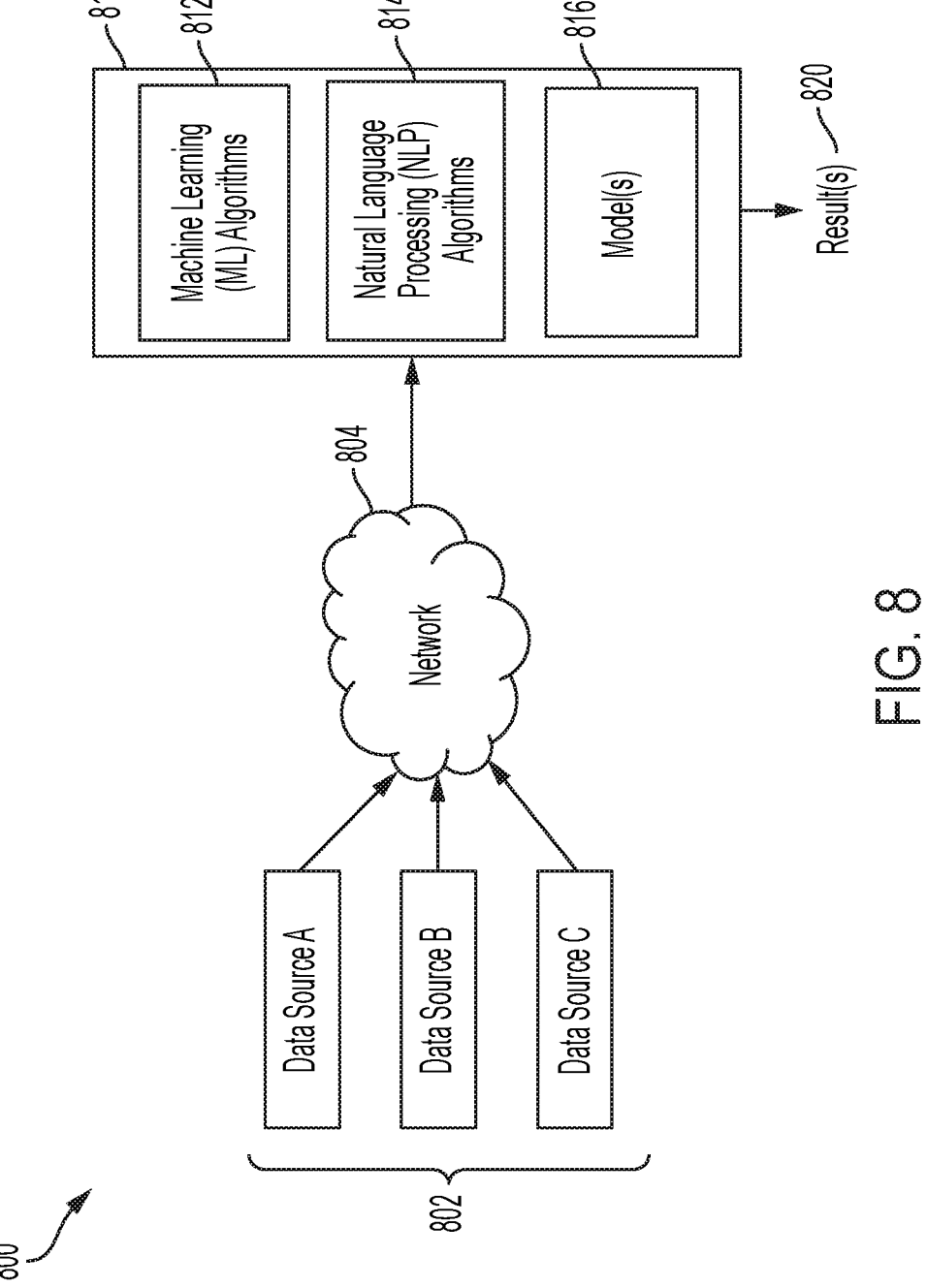
FIG. 8 depicts a block diagram illustrating an example implementation of a neural network that can be used to implement the neural network shown in FIG. 2, and that can be used to implement portions of the training methodology and the prediction methodology shown in FIG. 2.

FIG. 8 depicts a block diagram showing a classifier (or predictive) system 800 capable of implementing various aspects of the invention described herein, including operations performed by the neural networks 250, 250A (shown in FIGS. 2 and 5), as well as machine learning operations performed by the SMM tool 608 (shown in FIG. 6). More specifically, the functionality of the system 800 is used in embodiments of the invention to generate various models and sub-models that can be used to implement computer functionality in embodiments of the invention. The system 800 includes multiple data sources 802 in communication through a network 804 with a classifier (or predictor) 810. In some aspects of the invention, the data sources 802 can bypass the network 804 and feed directly into the classifier 810. The data sources 802 provide data/information inputs that will be evaluated by the classifier 810 in accordance with embodiments of the invention. The data sources 802 also provide data/information inputs that can be used by the classifier 810 to train and/or update model(s) 816 created by the classifier 810. The data sources 802 can be implemented as a wide variety of data sources, including but not limited to, sensors configured to gather real time data, data repositories (including training data repositories), and outputs from other classifiers. The network 804 can be any type of communications network, including but not limited to local networks, wide area networks, private networks, the Internet, and the like.

The classifier 810 can be implemented as algorithms executed by a programmable computer such as a processing system 1400 (shown in FIG. 14). As shown in FIG. 8, the classifier 810 includes a suite of machine learning (ML) algorithms 812; natural language processing (NLP) algorithms 814; and model(s) 816 that are relationship (or prediction) algorithms generated (or learned) by the ML algorithms 812. The algorithms 812, 814, 816 of the classifier 810 are depicted separately for ease of illustration and explanation. In embodiments of the invention, the functions performed by the various algorithms 812, 814, 816 of the classifier 810 can be distributed differently than shown. For example, where the classifier 810 is configured to perform an overall task having sub-tasks, the suite of ML algorithms 812 can be segmented such a portion of the ML algorithms 812 executes each sub-task and a portion of the ML algorithms 812 executes the overall task. Additionally, in some embodiments of the invention, the NLP algorithms 814 can be integrated within the ML algorithms 812.

The NLP algorithms 814 include speech recognition functionality that allows the classifier 810, and more specifically the ML algorithms 812, to receive natural language data (text and/or audio) and apply elements of language processing, information retrieval, and machine learning to derive meaning from the natural language inputs and potentially take action based on the derived meaning. The NLP algorithms 814 used in accordance with aspects of the invention can also include speech synthesis functionality that allows the classifier 810 to translate the result(s) 820 into natural language (text and/or audio) to communicate aspects of the result(s) 820 as natural language communications.

The NLP and ML algorithms 814, 812 receive and evaluate input data (i.e., training data and data-under-analysis) from the data sources 802. The ML algorithms 812 include functionality that is necessary to interpret and utilize the input data's format. For example, where the data sources 802 include image data, the ML algorithms 812 can include visual recognition software configured to interpret image data. The ML algorithms 812 apply machine learning techniques to received training data (e.g., data received from one or more of the data sources 802) in order to, over time, create/train/update one or more models 816 that model the overall task and the sub-tasks that the classifier 810 is designed to complete.

Referring now to FIGS. 8 and 9 collectively, FIG. 9 depicts an example of a learning phase 900 performed by the ML algorithms 812 to generate the above-described models 816. In the learning phase 900, the classifier 810 extracts features from the training data and coverts the features to vector representations that can be recognized and analyzed by the ML algorithms 812. The features vectors are analyzed by the ML algorithm 812 to "classify" the training data against the target model (or the model's task) and uncover relationships between and among the classified training data. Examples of suitable implementations of the ML algorithms 812 include but are not limited to neural networks, support vector machines (SVMs), logistic regression, decision trees, hidden Markov Models (HMMs), etc. The learning or training performed by the ML algorithms 812 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 810 and the ML algorithms 812. Unsupervised learning can utilize additional learning/training methods including, for example, clustering, anomaly detection, neural networks, deep learning, and the like.

When the models 816 are sufficiently trained by the ML algorithms 812, the data sources 802 that generate "real world" data are accessed, and the "real world" data is applied to the models 816 to generate usable versions of the results 820. In some embodiments of the invention, the results 820 can be fed back to the classifier 810 and used by the ML algorithms 812 as additional training data for updating and/or refining the models 816.

In aspects of the invention, the ML algorithms 812 and the models 816 can be configured to apply confidence levels (CLs) to various ones of their results/determinations (including the results 820) in order to improve the overall accuracy of the particular result/determination. When the ML algorithms 812 and/or the models 816 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 810 can be configured to apply confidence levels (CLs) to the results 820. When the classifier 810 determines that a CL in the results 820 is below a predetermined threshold (TH) (i.e., CL<TH), the results 820 can be classified as sufficiently low to justify a classification of "no confidence" in the results 820. If CL>TH, the results 820 can be classified as sufficiently high to justify a determination that the results 820 are valid. Many different predetermined TH levels can be provided such that the results 820 with CL>TH can be ranked from the highest CL>TH to the lowest CL>TH.

The functions performed by the classifier 810, and more specifically by the ML algorithm 812, can be organized as a weighted directed graph, wherein the nodes are artificial neurons (e.g. modeled after neurons of the human brain), and wherein weighted directed edges connect the nodes. The directed graph of the classifier 810 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 810 can perform unsupervised deep-learning for executing the assigned task(s) of the classifier 810.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 810 processes data records (e.g., outputs from the data sources 802) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 810 and used to modify the weighted directed graph's weighted connections the second time around, and this feedback process continues for many iterations. In the training phase of a weighted directed graph of the classifier 810, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

Figure 10:
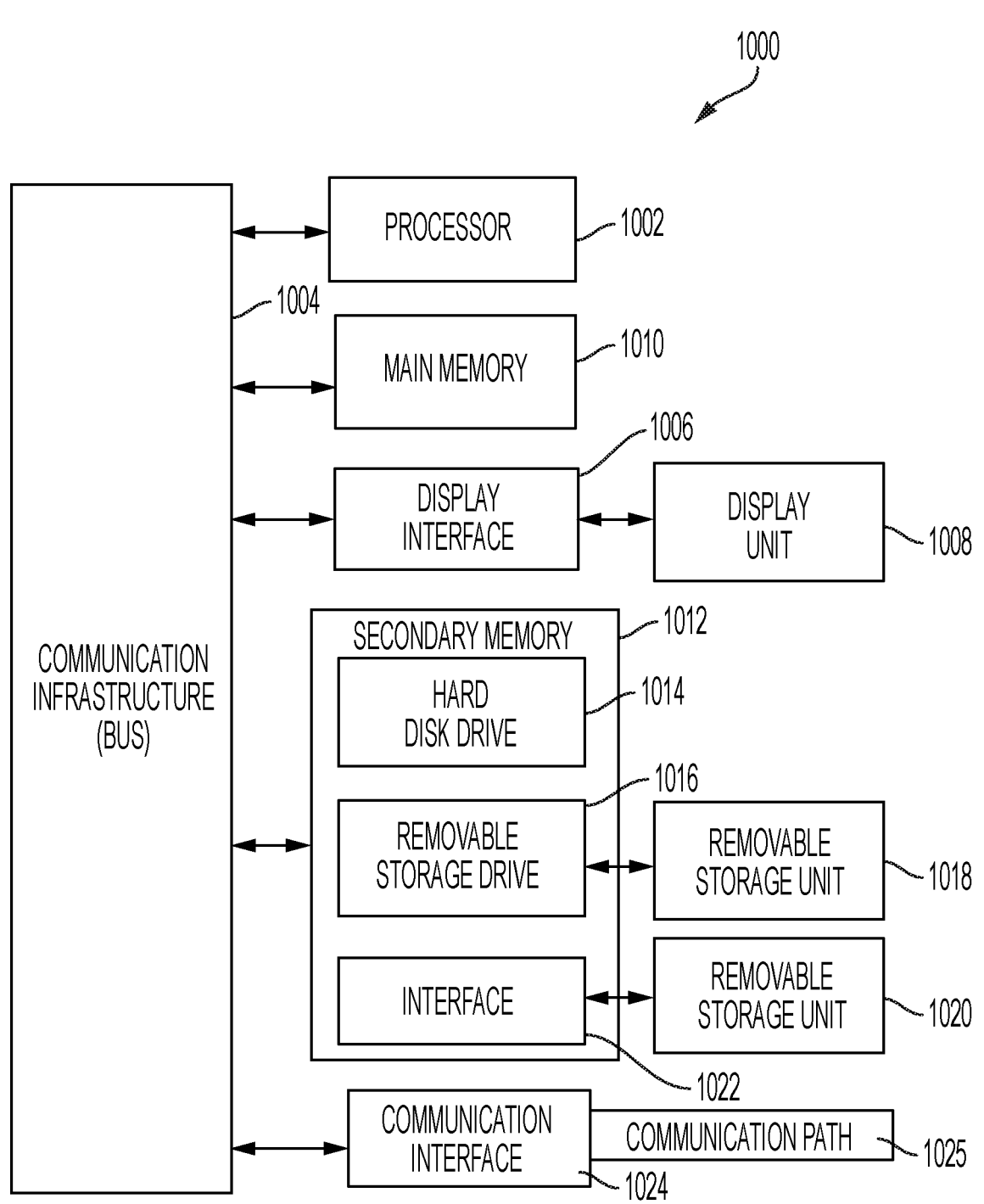
FIG. 10 depicts details of an exemplary computing system capable of implementing various aspects of the invention.

FIG. 10 depicts a high level block diagram of the computer system 1000, which can be used to implement one or more computer processing operations in accordance with aspects of the present invention. Although one exemplary computer system 1000 is shown, computer system 1000 includes a communication path 1025, which connects computer system 1000 to additional systems (not depicted) and can include one or more wide area networks (WANs) and/or local area networks (LANs) such as the Internet, intranet(s), and/or wireless communication network(s). Computer system 1000 and the additional systems are in communication via communication path 1025, e.g., to communicate data between them. In some embodiments of the invention, the additional systems can be implemented as one or more cloud computing systems 50. The cloud computing system 50 can supplement, support or replace some or all of the functionality (in any combination) of the computer system 1000, including any and all computing systems described in this detailed description that can be implemented using the computer system 1000. Additionally, some or all of the functionality of the various computing systems described in this detailed description can be implemented as a node of the cloud computing system 50.

Computer system 1000 includes one or more processors, such as processor 1002. Processor 1002 is connected to a communication infrastructure 1004 (e.g., a communications bus, cross-over bar, or network). Computer system 1000 can include a display interface 1006 that forwards graphics, text, and other data from communication infrastructure 1004 (or from a frame buffer not shown) for display on a display unit 1008. Computer system 1000 also includes a main memory 1010, preferably random access memory (RAM), and can also include a secondary memory 1012. Secondary memory 1012 can include, for example, a hard disk drive 1014 and/or a removable storage drive 1016, representing, for example, a floppy disk drive, a magnetic tape drive, or an optical disk drive. Removable storage drive 1016 reads from and/or writes to a removable storage unit 1018 in a manner well known to those having ordinary skill in the art. Removable storage unit 1018 represents, for example, a floppy disk, a compact disc, a magnetic tape, or an optical disk, flash drive, solid state memory, etc. which is read by and written to by removable storage drive 1016. As will be appreciated, removable storage unit 1018 includes a computer readable medium having stored therein computer software and/or data.

In alternative embodiments of the invention, secondary memory 1012 can include other similar means for allowing computer programs or other instructions to be loaded into the computer system. Such means can include, for example, a removable storage unit 1020 and an interface 1022. Examples of such means can include a program package and package interface (such as that found in video game devices), a removable memory chip (such as an EPROM, or PROM) and associated socket, and other removable storage units 1020 and interfaces 1022 which allow software and data to be transferred from the removable storage unit 1020 to computer system 1000.

Computer system 1000 can also include a communications interface 1024. Communications interface 1024 allows software and data to be transferred between the computer system and external devices. Examples of communications interface 1024 can include a modem, a network interface (such as an Ethernet card), a communications port, or a PCM-CIA slot and card, etcetera. Software and data transferred via communications interface 1024 are in the form of signals which can be, for example, electronic, electromagnetic, optical, or other signals capable of being received by communications interface 1024. These signals are provided to communications interface 1024 via communication path (i.e., channel) 1025. Communication path 1025 carries signals and can be implemented using wire or cable, fiber optics, a phone line, a cellular phone link, an RF link, and/or other communications channels.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of executing a predictive labeling pipeline of a processor system, the computer-implemented method comprising:

receiving, using the processor system and an input communications path, unlabeled error logs (ELs) during a runtime of software from which the unlabeled ELs are generated, the software comprising systems software and database management (DBM) software, the systems software configured to manage software operations of a computer that hosts the systems software, the DBM software configured to control data storage, retrieval and organization operations performed by a database;

wherein EL formats of the unlabeled ELs comprise:

systems software machine-generated codes created for communication between non-human electronic entities;

DBM software machine-generated codes created for communication between non-human electronic entities; and text not in a sentence format;

wherein the predictive labeling pipeline comprises a plurality of interconnected modules including a keyword extraction module, a context-based search and prediction module, and a neural network prediction module, each implemented as executable code stored in memory and executed by the processor system;

placing, using the processor system, the unlabeled ELs into the predictive labeling pipeline; and using the plurality of interconnected modules to apply, during the runtime of the software from which the unlabeled ELs are generated, multiple iterations of a set of pipeline operations to the predictive labeling pipeline, wherein the set of pipeline operations converts each of the unlabeled ELs to a labeled EL having a structured EL format;

wherein the set of pipeline operations include context-based search and prediction operations;

wherein the context-based search and prediction operations comprise, responsive to one or more keywords extracted using the keyword extraction module from one or more of the unlabeled ELs, using the context-based search and prediction module to search a plurality of electronic documents (EDs) in a plurality of locations and apply a keyphrase extraction and prediction algorithm to the plurality of EDs in the plurality of locations to select and extract one or more context-aware natural language (NL) description sentences that the keyphrase extraction and prediction algorithm predicts to provide context and descriptions of issues associated with one or more of the unlabeled ELs:

wherein the search-based pipeline operations further comprise using the context-based search and prediction module to apply a keyphrase extraction and prediction algorithm to the one or more context-aware NL description sentences to extract NL description sentence keywords from the one or more context-aware NL description sentences; and wherein the set of pipeline operations converts each of the unlabeled ELs to an instance of the labeled EL having the structured EL format based at least in part on the one or more keywords extracted from one or more of the unlabeled ELs, the context-aware NL description sentences, and the one or more NL description sentence keywords extracted from the context-aware NL description sentences.

2. The computer-implemented method of claim 1, wherein:

the set of pipeline operations include label prediction pipeline operations; and the label prediction pipeline operations comprise using the neural network prediction module to apply a NL-based question and answer (Q&A) prediction algorithm to the one or more keywords extracted from one or more of the unlabeled ELs, the context-aware NL description sentences, and the one or more NL description sentence keywords extracted from the context-aware NL description sentences to generate predicted labels for the one or more keywords extracted from one or more of the unlabeled ELs, the context-aware NL description sentences, and the one or more NL description sentence keywords extracted from the context-aware NL description sentences.

3. The computer-implemented method of claim 2, wherein the NL-based Q&A prediction algorithm is trained using a training data set that includes multiple types of ELs that have been labeled at a level of detail that applies to multiple types of the software from which the unlabeled ELs are generated.

4. The computer-implemented method of claim 2, wherein the predicted labels comprise metadata that provides predicted answer information about an underlying performance issue that caused the software to generate an associated one of the unlabeled ELs.

5. The computer-implemented method of claim 4, wherein the set of pipeline operations converts each of the unlabeled ELs to an instance of the labeled EL having the structured EL format further based at least in part on the predicted labels.

6. The computer-implemented method of claim 4, wherein the set of pipeline operations converts each of the unlabeled ELs to an instance of the labeled EL having the structured EL format further based at least in part on populating user-selected fields of the structured EL format with the predicted labels.

7. The computer-implemented method of claim 1, wherein:

the context-based search and prediction module is configured to access the plurality of locations through one or more networks; and the plurality of EDs is selected from the group consisting of a website posting, an article, and an operating manual.

8. The computer-implemented method of claim 1 further comprising controlling, by a post-processing module, a topic and entity relation extraction module to use the labeled EL having the structured EL format as a guide to electronically search for and locate relevant EDs from which topic and entity relation information can be extracted.

9. A computer system comprising:

a memory; and a processor system communicatively coupled to the memory, wherein the processor system is configured to perform processor system operations that execute a predictive labeling pipeline, the processor system operations comprising:

receiving using the processor system and an input communications path unlabeled error logs (ELs) during a runtime of software from which the unlabeled ELs are generated, the software comprising systems software and database management (DBM) software, the systems software configured to manage software operations of a computer that hosts the systems software, the DBM software configured to control data storage, retrieval and organization operations performed by a database;

wherein EL formats of the unlabeled ELs comprise:

systems software machine-generated codes created for communication between non-human electronic entities;

DBM software machine-generated codes created for communication between non-human electronic entities; and text not in a sentence format;

wherein the predictive labeling pipeline comprises a plurality of interconnected modules including a keyword extraction module, a context-based search and prediction module, and a neural network prediction module, each implemented as executable code stored in memory and executed by the processor system;

placing, using the processor system, the unlabeled ELs into the predictive labeling pipeline; and using the plurality of interconnected modules to apply, during the runtime of the software from which the unlabeled ELs are generated, multiple iterations of a set of pipeline operations to the predictive labeling pipeline, wherein the set of pipeline operations converts each of the unlabeled ELs to a labeled EL having a structured EL format;

wherein the set of pipeline operations include context-based search and prediction operations;

wherein the context-based search and prediction operations comprise, responsive to one or more keywords extracted using the keyword extraction module from one or more of the unlabeled ELs, using the context-based search and prediction module to search a plurality of electronic documents (EDs) in a plurality of locations and apply a keyphrase extraction and prediction algorithm to the plurality of EDs in the plurality of locations to select and extract one or more context-aware natural language (NL) description sentences that the keyphrase extraction and prediction algorithm predicts to provide context and descriptions of issues associated with one or more of the unlabeled ELs:

wherein the search-based pipeline operations further comprise using the context-based search and prediction module to apply a keyphrase extraction and prediction algorithm to the one or more context-aware NL description sentences to extract NL description sentence keywords from the one or more context-aware NL description sentences; and wherein the set of pipeline operations converts each of the unlabeled ELs to an instance of the labeled EL having the structured EL format based at least in part on the one or more keywords extracted from one or more of the unlabeled ELs, the context-aware NL description sentences, and the one or more NL description sentence keywords extracted from the context-aware NL description sentences.

10. The computer system of claim 9, wherein:

the set of pipeline operations include label prediction pipeline operations; and the label prediction pipeline operations comprise using the neural network prediction module to apply a NL-based question and answer (Q&A) prediction algorithm to the one or more keywords extracted from one or more of the unlabeled ELs, the context-aware NL description sentences, and the one or more NL description sentence keywords extracted from the context-aware NL description sentences to generate predicted labels for the one or more keywords extracted from one or more of the unlabeled ELs, the context-aware NL description sentences, and the one or more NL description sentence keywords extracted from the context-aware NL description sentences.

11. The computer system of claim 10, wherein the NL-based Q&A prediction algorithm is trained using a training data set that includes multiple types of ELs that have been labeled at a level of detail that applies to multiple types of the software from which the unlabeled ELs are generated.

12. The computer system of claim 10, wherein the predicted labels comprise metadata that provides predicted answer information about an underlying performance issue that caused the software to generate an associated one of the unlabeled ELs.

13. The computer system of claim 12, wherein the set of pipeline operations converts each of the unlabeled ELs to an instance of the labeled EL having the structured EL format further based at least in part on the predicted labels.

14. The computer system of claim 12, wherein the set of pipeline operations converts each of the unlabeled ELs to an instance of the labeled EL having the structured EL format further based at least in part on populating user-selected fields of the structured EL format with the predicted labels.

15. The computer system of claim 9, wherein:

the context-based search and prediction module is configured to access the plurality of locations through one or more networks; and the plurality of EDs is selected from the group consisting of a website posting, an article, and an operating manual.

16. The computer system of claim 9, wherein the processor system operations further comprise controlling, by a post-processing module, a topic and entity relation extraction module to use the labeled EL having the structured EL format as a guide to electronically search for and locate relevant EDs from which topic and entity relation information can be extracted.

17. A computer program product comprising a computer readable program stored on a computer readable storage medium, wherein the computer readable program when executed by a processor system causes the processor system to perform processor operations that execute a predictive labeling pipeline, the processor system operations comprising:

receiving using the processor system and an input communications path unlabeled error logs (ELs) during a runtime of software from which the unlabeled ELs are generated, the software comprising systems software and database management (DBM) software, the systems software configured to manage software operations of a computer that hosts the systems software, the DBM software configured to control data storage, retrieval and organization operations performed by a database;

wherein EL formats of the unlabeled ELs comprise: EL having the EL format comprises:

systems software machine-generated codes created for communication between non-human electronic entities;

DBM software machine-generated codes created for communication between non-human electronic entities; and text not in a sentence format;

wherein the predictive labeling pipeline comprises a plurality of interconnected modules including a keyword extraction module, a context-based search and prediction module, and a neural network prediction module, each implemented as executable code stored in memory and executed by the processor system;

placing, using the processor system, the unlabeled ELs into the predictive labeling pipeline; and using the plurality of interconnected modules to apply, during the runtime of the software from which the unlabeled ELs are generated, multiple iterations of a set of pipeline operations to the predictive labeling pipeline, wherein the set of pipeline operations converts each of the unlabeled ELs to a labeled EL having a structured EL format;

wherein the set of pipeline operations include context-based search and prediction operations;

wherein the context-based search and prediction operations comprise, responsive to one or more keywords extracted using the keyword extraction module from one or more of the unlabeled ELs, using the context-based search and prediction module to search a plurality of electronic documents (EDs) in a plurality of locations and apply a keyphrase extraction and prediction algorithm to the plurality of EDs in the plurality of locations to select and extract one or more context-aware natural language (NL) description sentences that the keyphrase extraction and prediction algorithm predicts to provide context and descriptions of issues associated with one or more of the unlabeled ELs:

wherein the search-based pipeline operations further comprise using the context-based search and prediction module to apply a keyphrase extraction and prediction algorithm to the one or more context-aware NL description sentences to extract NL description sentence keywords from the one or more context-aware NL description sentences; and wherein the set of pipeline operations converts each of the unlabeled ELs to an instance of the labeled EL having the structured EL format based at least in part on the one or more keywords extracted from one or more of the unlabeled ELs, the context-aware NL description sentences, and the one or more NL description sentence keywords extracted from the context-aware NL description sentences.

18. The computer program product of claim 17, wherein:

the set of pipeline operations include label prediction pipeline operations; and the label prediction pipeline operations comprise using the neural network prediction module to apply a NL-based question and answer (Q&A) prediction algorithm to the one or more keywords extracted from one or more of the unlabeled ELs, the context-aware NL description sentences, and the one or more NL description sentence keywords extracted from the context-aware NL description sentences to generate predicted labels for the one or more keywords extracted from one or more of the unlabeled ELs, the context-aware NL description sentences, and the one or more NL description sentence keywords extracted from the context-aware NL description sentences.

19. The computer program product of claim 18, wherein the NL-based Q&A prediction algorithm is trained using a training data set that includes multiple types of ELs that have been labeled at a level of detail that applies to multiple types of the software from which the unlabeled ELs are generated.

20. The computer program product of claim 17, wherein the processor system operations further comprise controlling, by a post-processing module, a topic and entity relation extraction module to use the labeled EL having the structured EL format as a guide to electronically search for and locate relevant EDs from which topic and entity relation information can be extracted.

* * * * *